Aug. 19, 1947.   A. P. BUQUOR   2,425,783
FIRING PLATFORM FOR ARTILLERY
Filed Aug. 23, 1943   9 Sheets-Sheet 1

Inventor
Adolph P. Buquor
By Bacon & Thomas
Attorneys

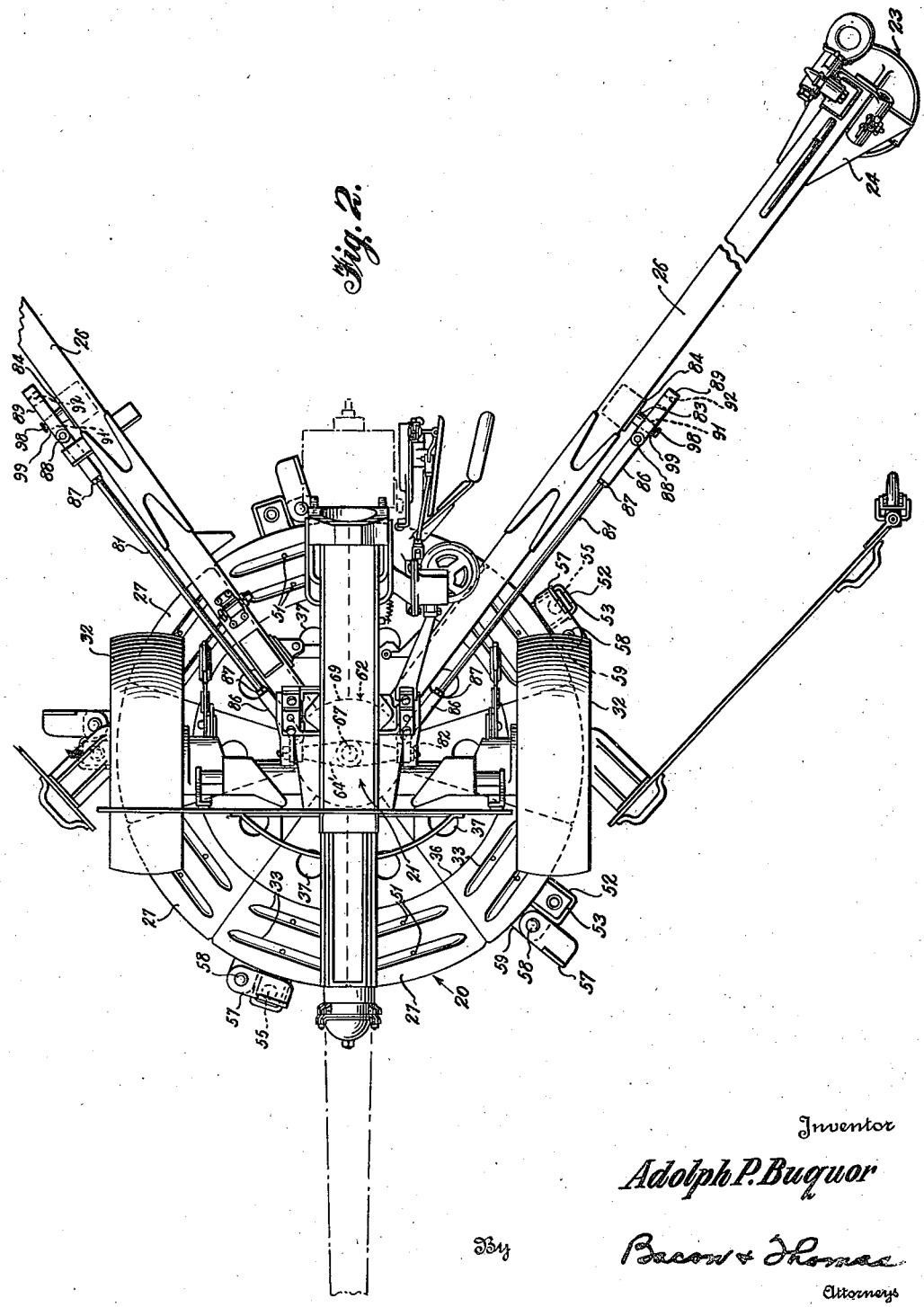

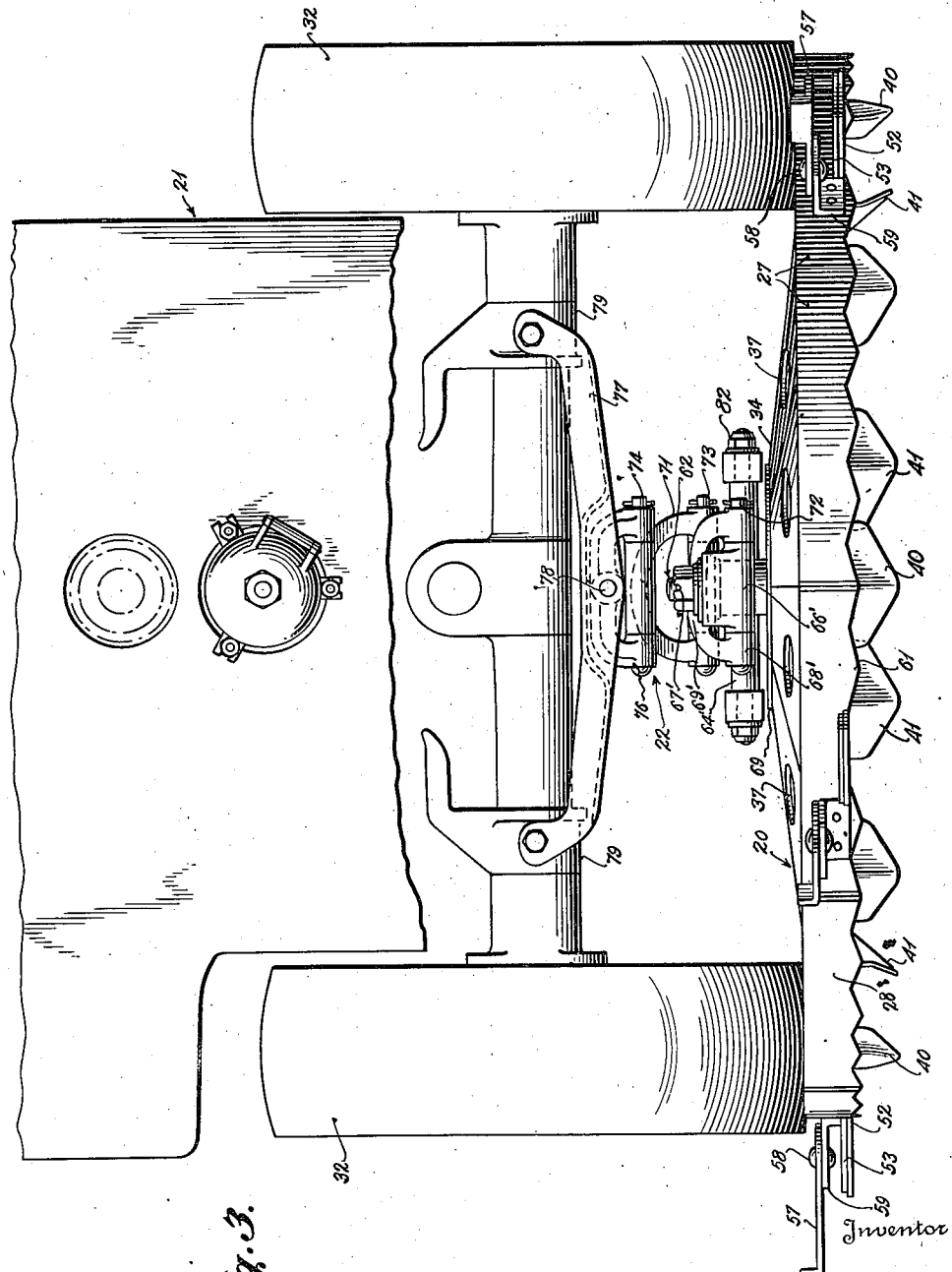

Aug. 19, 1947.  A. P. BUQUOR  2,425,783
FIRING PLATFORM FOR ARTILLERY
Filed Aug. 23, 1943  9 Sheets-Sheet 4

Inventor
Adolph P. Buquor
By Bacon & Thomas
Attorneys

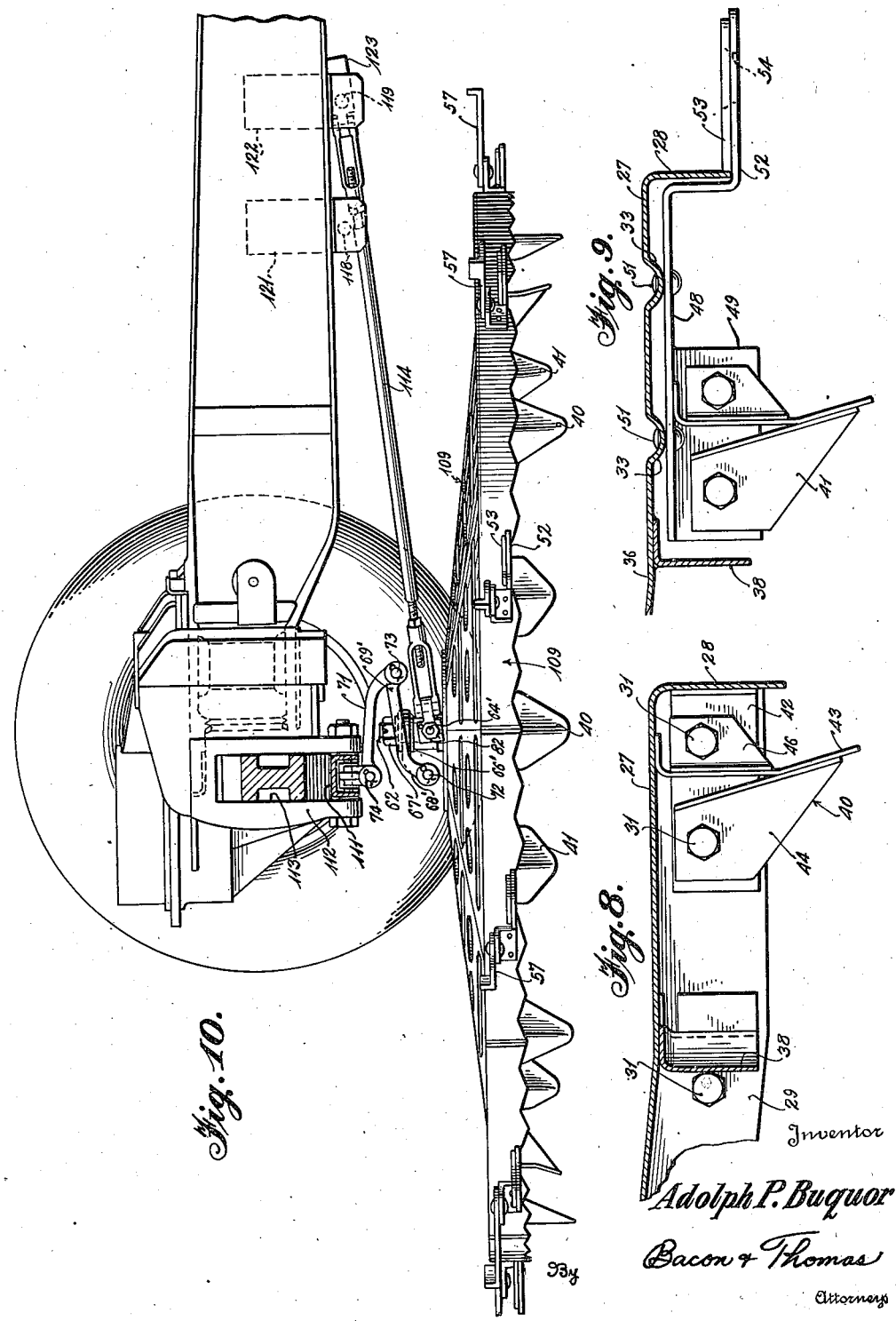

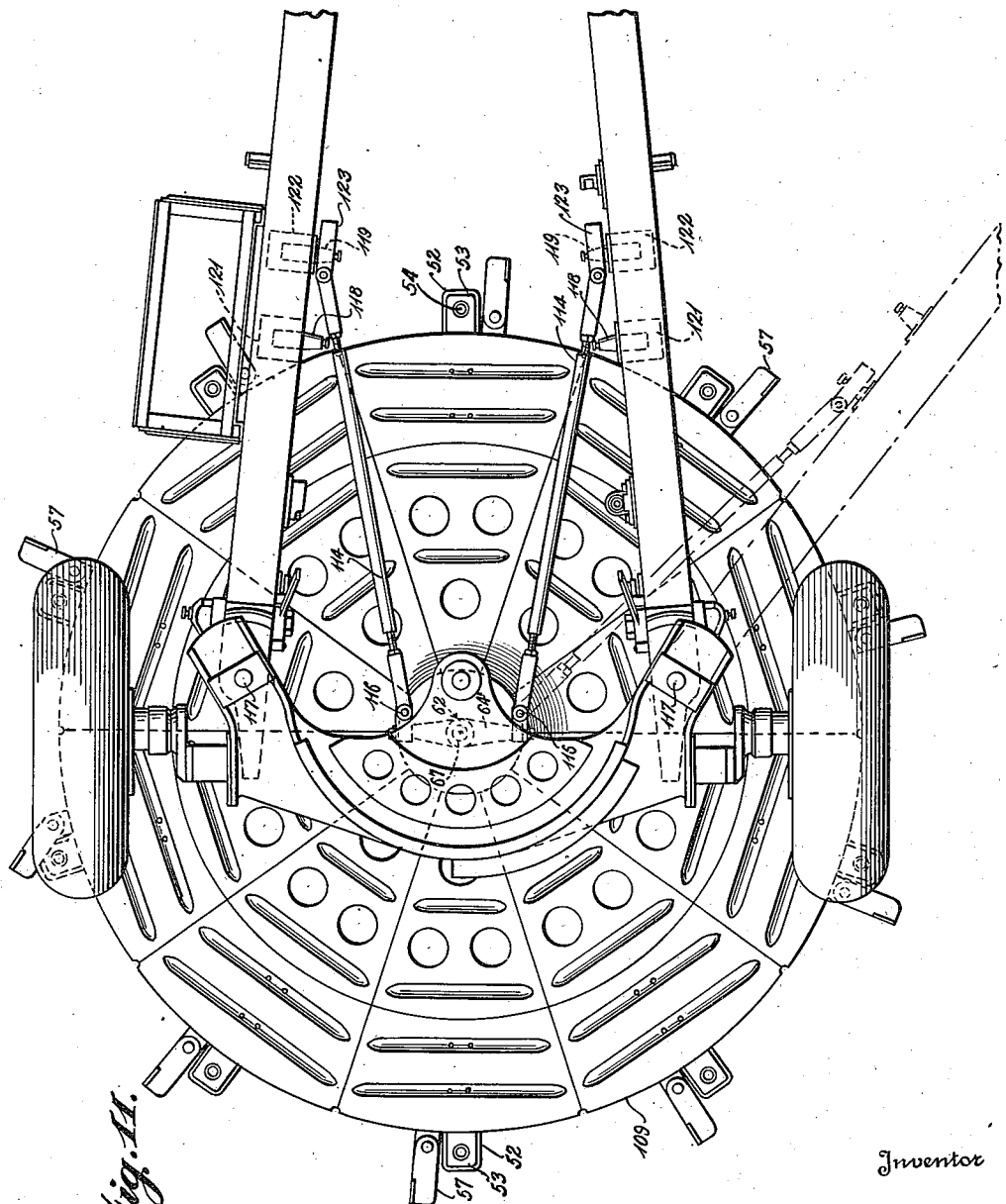

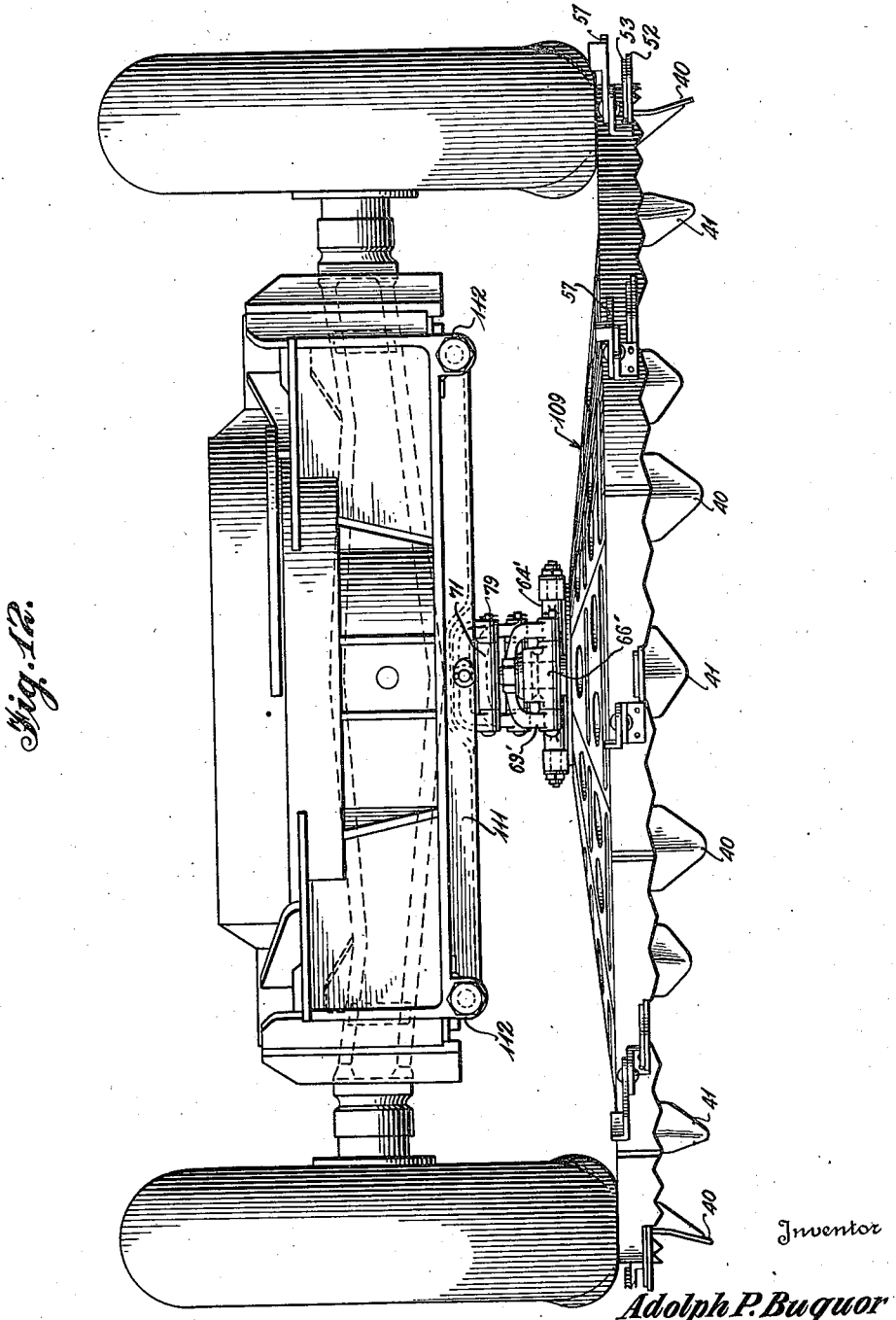

Aug. 19, 1947.  A. P. BUQUOR  2,425,783
FIRING PLATFORM FOR ARTILLERY
Filed Aug. 23, 1943   9 Sheets-Sheet 8

Inventor
Adolph P. Buquor
By Bacon + Thomas
Attorneys

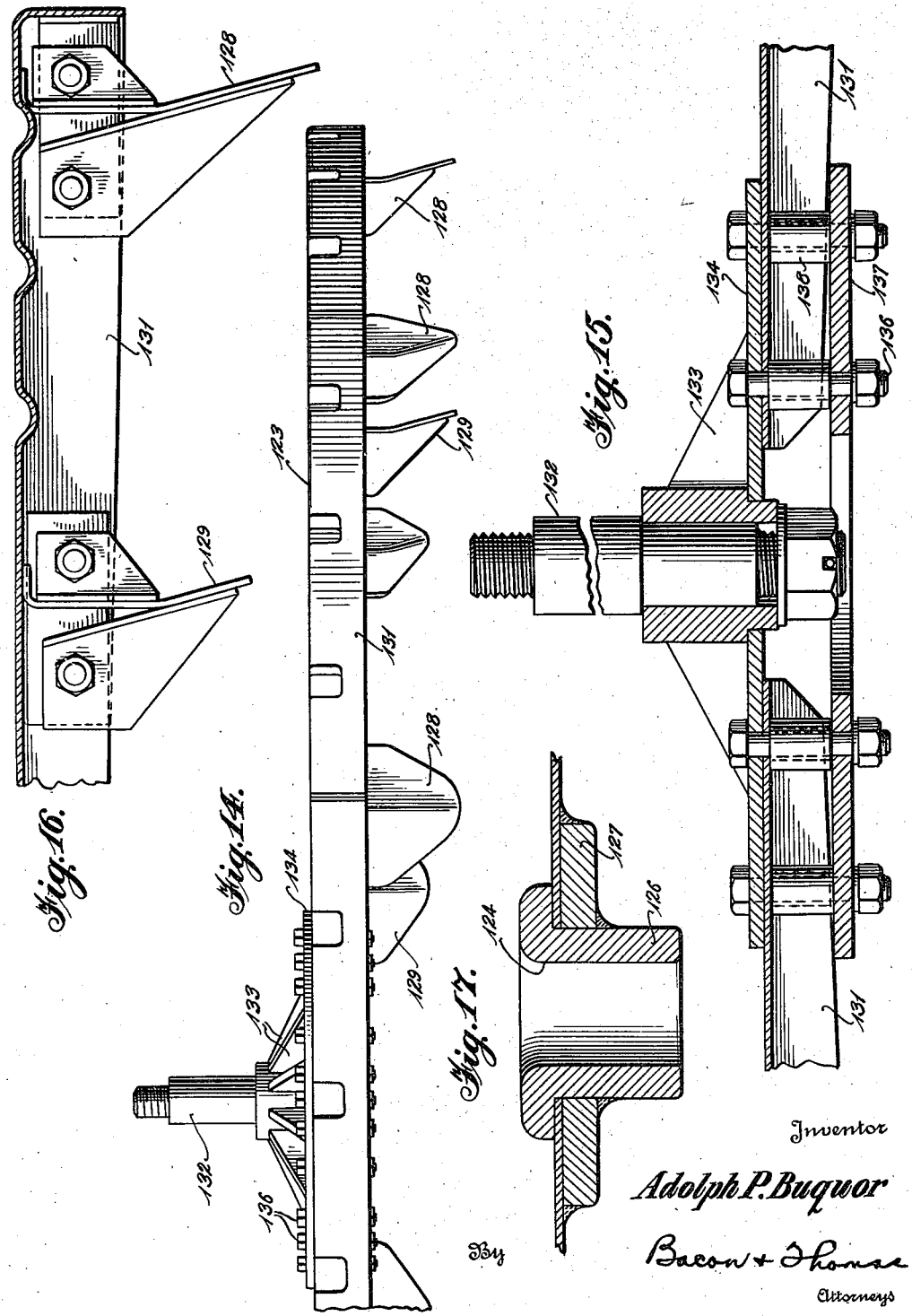

Patented Aug. 19, 1947

2,425,783

UNITED STATES PATENT OFFICE 2,425,783

FIRING PLATFORM FOR ARTILLERY

Adolph P. Buquor, Washington, D. C., assignor to Martin-Parry Corporation, York, Pa., a corporation of Delaware Application August 23, 1943, Serial No. 499,665

9 Claims. (Cl. 89—40)

This invention relates to firing platforms and more particularly to a platform and auxiliary apparatus for supporting the carriage of an artillery field piece during firing thereof so as to provide for more efficient handling of the gun during firing and to absorb the shock of recoil without substantial misalignment of the gun. In the firing of field pieces as ordinarily constructed irregularities in the ground or other supporting surface render it difficult to make rapid major traverses of the gun. Also the entire recoil shock is absorbed by the trail spades and as these spades tend to penetrate further during each firing operation the gun must be realigned after each firing operation. This is particularly true if the trail spades of the gun having a divided trail differentially pentrate into the ground or other supporting surface.

In accordance with the present invention a gun platform is provided having a plurality of small spades or ground pentrating instrumentalities and is so constructed that it tends to remain at a given position on a supporting surface. The gun is returned to a definite position with respect to the gun platform after each firing operation. In most cases the trail spades of the gun are prevented from penetrating into the ground so as to substantially eliminate vertical misalignment of the gun. The gun platform absorbs substantially the entire recoil shock and in addition provides a smooth supporting surface for the wheels of the field piece and enables the entire gun carriage to be rapidly traversed by movement of the trails of the guns. Since the trails are prevented from penetrating into the ground the gun carriage can be much more easily handled by the gun crew in making major traverses of the gun.

It is therefore an object of the invention to provide an improved firing platform for an artillery gun such as a field piece.

Another object of the invention is to provide a firing platform for an artillery gun which maintains the gun in alignment and absorbs substantially all of the recoil shock of the gun.

Another object of the invention is to provide a firing platform which maintains its position upon the ground or other supporting surface and on which the gun is supported for movement in a vertical direction, but which brings the gun to rest in substantially its original position.

A further object of the invention is to provide a firing platform flexibly connected to a gun carriage so that the gun may be easily traversed by movement of the trails but which maintains the gun in alignment during repeated firing thereof.

A still further object of the invention is to provide a firing platform to which the gun may be readily and quickly attached or detached and which provides a stable support during repeated firing of the gun.

Other objects and advantages of the invention will appear in the following description of preferred embodiments thereof shown in the attached drawings of which Fig. 1 is an elevation with certain parts removed of one form of gun mounted upon a firing platform of the present invention;

Fig. 2 is a plan view of the arrangement of Fig. 1;

Fig. 3 is a fragmentary elevation of the arrangements of Figs. 1 and 2;

Fig. 8 is a fragmentary sectional view on the line 8—8 of Fig. 6 showing one of the spades of the firing platform;

Fig. 9 is a view similar to Fig. 8 on the line 9—9 of Fig. 6;

Fig. 10 is a partial elevation with certain of the parts removed of another type of gun mounted upon a modified firing platform;

Fig. 11 is a partial plan view of the arrangement of Fig. 10;

Fig. 12 is a partial front elevation of the arrangement of Figs. 10 and 11;

Fig. 14 is a partial elevation of the platform of Fig. 13;

Fig. 15 is a fragmentary vertical section taken on the line 15—15 of Fig. 13;

Fig. 16 is a fragmentary section taken on the line 16—16 of Fig. 13;

Fig. 17 is a horizontal section taken on the line 17—17 of Fig. 13; and

Figure 1:
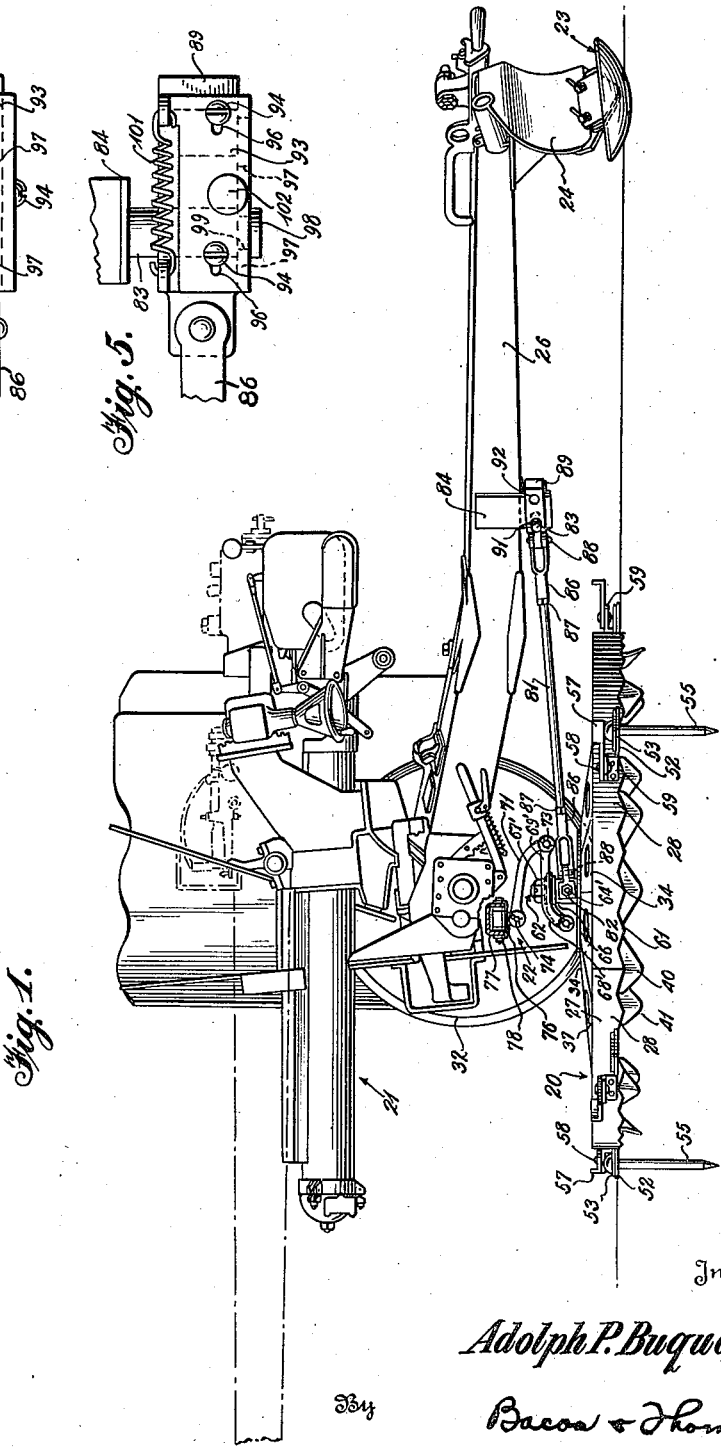

Referring particularly to Figs. 1 to 3, 20 indicates, in general, a firing platform in accordance with the present invention, 21 indicates, in general, the gun or field piece mounted thereon, 22 indicates, in general, the mechanism for attaching the field piece to the firing platform, and 23 indicates a shoe for the spade 24 of each of the trails 26. As shown most clearly in Figs. 1 and 6 to 8, the firing platform preferably comprises a plurality of sectors 27, all of which may be substantially identical. These sectors may be fabricated of sheet metal and each sector may have a downwardly turned peripheral flange 28 shown in Figs. 8 and 9 and downwardly turned side flanges 29 shown in Figs. 7 and 8. The side flanges of the various sectors may be secured together by any suitable means such as rivets or bolts 31, the latter being preferred so that the firing platform may be disassembled for shipment, storage, etc. When the sectors 27 are secured together they form a circular platform having a relatively smooth upper surface adjacent the periphery thereof or supporting the wheels 32 of the gun carriage. In order to stiffen the upper surface of the sectors in a lateral direction the sheet metal forming such surface is preferably formed with downwardly extending stiffening ribs 33, shown in Figs. 6 and 9. As shown in Fig. 1, the firing platform preferably has a crowned midportion 34 produced by bending the metal of the inner portions of the various sectors upwardly about the line 36 of Fig. 6. Each of the sectors may also be provided with one or more apertures 37 for reducing the weight of the firing platform in portions thereof where the stresses during the firing of the gun are not excessive.

Each of the sectors is also preferably provided with a downwardly turned flange member 38 (Figs. 8 and 9) spaced from the peripheral flange 28 and extending laterally across each sector. The flange member 38 may be secured to each of the sectors by welding or any other suitable means and in conjunction with the flange 28 provides a plurality of closed chambers adjacent the periphery of the firing platform. When the platform is in contact with the ground these chambers function as vacuum chambers to resist rapid raising of the platform from the ground.

Figure 6:
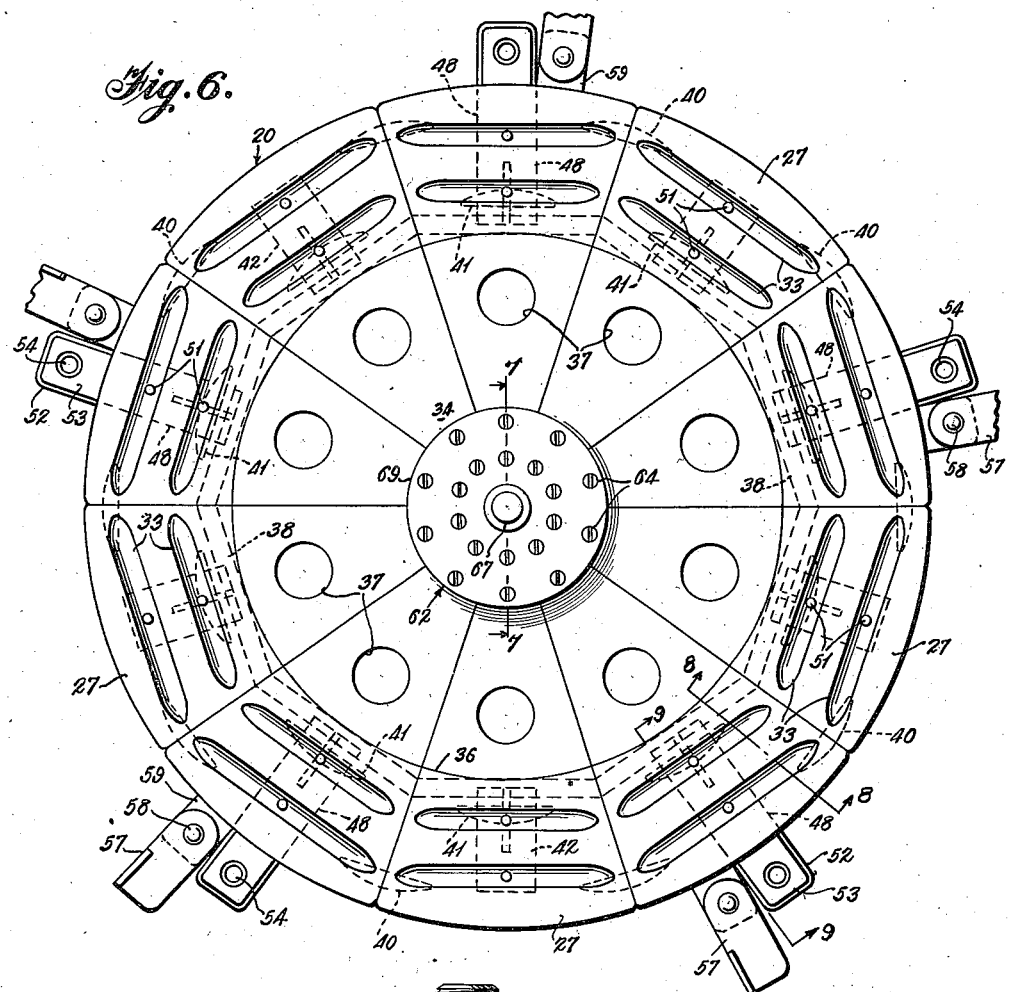
Fig. 6 is a plan view of one form of the firing platform.

When assembled the firing platform is preferably provided with a plurality of spade members 40 and 41 shown in Figs. 1, 8 and 9 and in dotted lines in Fig. 6. Spade members 40 are preferably arranged adjacent the periphery of the firing platform and are constructed to span and be attached to the downwardly extending side flanges 29 of the various sectors. Thus each of the spade members may be made up of a plurality of parts suitably secured together, for example by welding, including a pair of attaching members 42 positioned on opposite sides of the abutting flanges 29 of adjacent sectors 27, a main spade member 43 and a pair of bracing spade members 44 positioned on opposite sides of the flanges 29. The main spade member 43 is provided with a slot (not shown) which enables this member to span the adjacent flanges 29 of adjacent sectors 27 and is additionally braced by a pair of bracing members 46, positioned on opposite sides of the flanges 29. The spade assembly may be secured to the flanges 29 by any suitable means such as bolts 31. The spade assembly 41 may be similar in structure to the spade assembly 40, but instead of spanning and being secured to the flanges 29, may be secured to a supplemental supporting member 48 having a downwardly extending flange 49. As shown in Fig. 9 the supplemental support member 48 may be secured to the upper surface member of a sector 27 by means of rivets 51 or other suitable securing devices preferably positioned in the hollows of the supporting ribs 33. This enables the spade assemblies 41 to be spaced circumferentially from the spade assemblies 40 so that the spade members 40 and 41 are not in alignment and thus the spades are positioned so as to be effective over a larger area than if they were aligned radially of the firing platform.

As shown in Fig. 9, the supplementary supporting member 48 may have a portion 52 extending radially from the periphery of the firing platform through a notch in the flange 28 (see also Fig. 1). Extending portion 52 is preferably provided with a reinforcing member 53 suitably secured thereto, for example by welding, and the members 52 and 53 are provided with an aperture 54 to receive a spike 55, shown in Fig. 1. Where necessary to maintain the firing platform in a fixed position, the spikes 55 may be driven into the ground or other supporting surface. It has been found that firing of the gun tends to progressively pull the spikes, particularly those adjacent the forward portion of the platform, and in order to prevent this action the sectors having spike receiving members 52 and 53 are preferably provided with a spike retaining member 57 pivoted at 58 to a bracket 59 secured to the flange 28 of the sector. After the spike has been driven, the pivoted member 57 may be rotated about its pivot 58 so as to have a portion positioned over the head of the spike 55. It has been found that the weight of the gun and firing platform returns the spikes to their fully driven position after each firing of the gun even though the platform is partially raised from the ground. It will be apparent that all or a selected number of the sectors may be provided with the spike receiving members 52 and 53 along with the spike retaining members 57. As shown in Fig. 1, the flanges 28 of each of the sectors 27 are also preferably notched to provide supplemental spade members.

Figure 7:
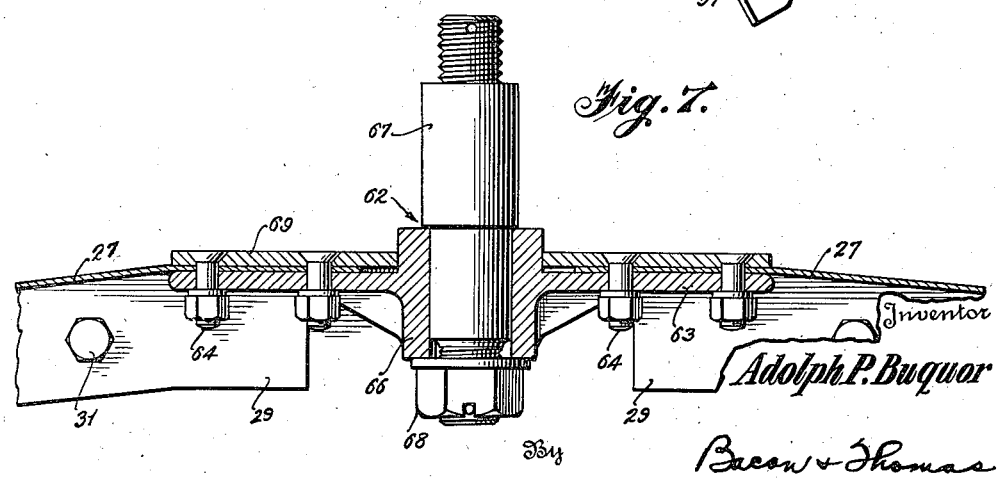
Fig. 7 is a fragmentary sectional view on the line 7—7 of Fig. 6.

As shown most clearly in Figs. 6 and 7, the sectors 27 preferably terminate short of the center of the firing platform to provide an aperture for receiving a centering spindle assembly 62. The assembly 62 may include a plate 63 suitably secured to the surface member of the sectors 27, for example by bolts 64. The plate 63 is preferably provided with a central boss 66 receiving the spindle 67 suitably secured therein, for example by the nut 68. A reinforcing plate 69 having an aperature for receiving the boss 66 and through which the bolts 64 also extend, is also preferably positioned above the upper surface members of the sectors 27. The plate 63 is provided with notches (not shown) for receiving the side flanges 29 of sectors 27.

Referring to Figs. 1, 2 and 3, the centering spindle 67 receives a cross member 64' (Fig. 2) and also a yoke supporting member 66' (Fig. 3), the cross member 64' and yoke supporting member 66' being provided with suitable bores and being retained upon the centering spindle 67 by a nut or other securing means 67'. The yoke supporting member 66' has a portion extending between the arms of a yoke member 68' which extends rearwardly of the gun and terminates in a portion 69' positioned between the arms of another yoke member 71. A horizontal pin 72 (see Fig. 10) pivotally connects the yoke supporting member 66' to the arms of the yoke 68' and a horizontal pin 73 (Figs. 1 and 3) pivotally connects the other end of the yoke member 68' to the arms of the yoke member 71. The yoke member 71 has its other end extending forwardly and is pivotally connected by a horizontal pin 74 between the arms of a vertically extending yoke member 76 which is also pivotally connected to an attaching member 77 by a horizontal pin 78 at right angles to the pin 74 and extending longitudinally of the gun. The attaching member 77 has arms extending laterally of the gun which are secured to suitable brackets carried by the axle of the gun. It will be apparent that the centering assembly thus far described, including the yoke supporting member 66', the yokes 68', 71 and 76, and the attaching member 77 provides by means of pins 72, 73 and 74 for vertical movement of the gun carriage relative to the firing platform and allows limited movement of the gun carriage longitudinally thereof with respect to the firing platform. The centering assembly, however, prevents lateral movement of the gun carriage with respect to the firing platform.

In order to prevent rearward movement of the gun with respect to the firing platform a pair of tension rods 81 is provided, each having one end thereof pivotally secured to the ends of the cross member 64' by any suitable attaching means such as nuts 82. The tension rods 81 also have their other ends pivotally secured to studs 83 carried by brackets 84 suitably secured to the gun trails 26. The tension rods 81 are adjustable in length, for example by threaded connections between the yokes 86 forming the ends of the tension rods 81 and the body of the rod in conjunction with locking nuts 87. The yokes 86 provide pivotal connections at 88 to provide for spreading or closing of the gun trails. It will be appreciated that in general the pivots adjacent the forward ends of the tension rods 81 will not be concentric with the journals of the gun trails on the gun carriage and that the variation in distance between the pivots of the tension rods 81 when the trails are opened or closed, must be compensated for. In the device shown in Figs. 1 to 3 this is provided for by terminating the rear ends of the tension rods 81 in an attaching block 89, each provided with two apertures 91 and 92. In general, the trails will either occupy their fully spread position or their fully closed position (not shown) and the apertures 91 and 92 are suitably spaced to engage the stud 83 in the two positions. The aperture 91 engaging the stud 83 in the open trail position and the aperture 92 engaging the stud 83 in the closed trail position.

Figure 4:
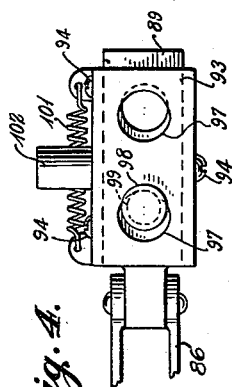
Fig. 4 is an elevation of an attaching device which may be employed in the present invention.
Figure 5:
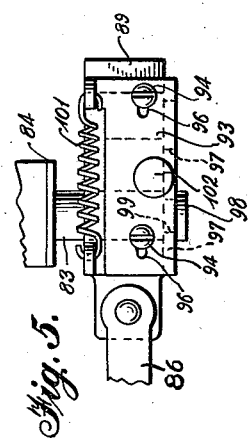
Fig. 5 is a plan view of the device of Fig. 4.

A quick attaching and detaching mechanism for holding the block 89 engaged upon the studs 83 is preferably provided, but this mechanism is omitted for clearness from Figs. 1 and 2. A suitable mechanism for this purpose is shown in Figs. 4 and 5. In these figures the block 89 may be provided with a sliding latching plate 93 secured thereto by suitable attaching means, such as screws 94 threaded into the block 89 and having their shanks positioned in slots 96 in the latching plate 93. The latching plate 93 is provided with enlarged apertures 97 sufficiently large to clear the head 98 (Fig. 2) of the stud 83 when moved to the right in Fig. 4 but having a smaller portion which engages in the slot 99 (Fig. 2) of the stud 83 when the plate is moved to the left in Fig. 4. A spring 101 urges the latching plate 93 to the left in Fig. 4 to latch the studs 83 to the block 89 but the plate may be moved to the right to release the studs by means of a handle 102. This structure provides for quick detachability of the tension rods 81 from the trails 26 so that the trails can be moved from open position to closed position or vice versa, and the rods again quickly attached.

Figure 18:
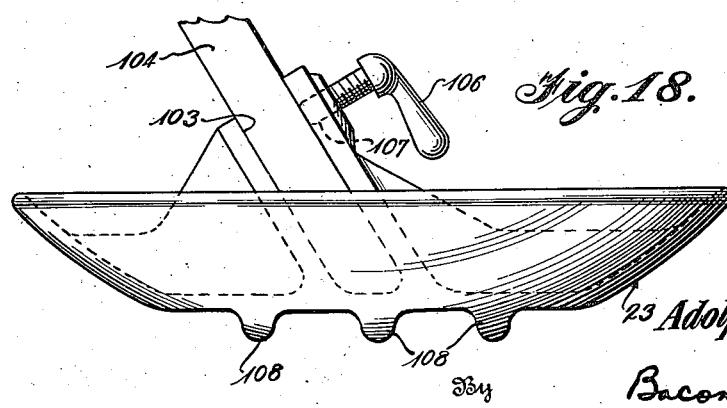
Fig. 18 is a side elevation of a spade shoe for preventing penetration of the trail spades during firing of the gun.

It has been found that the firing platform thus described maintains the gun accurately centered on the platform both laterally and longitudinally of the gun. It has been further found that the firing platform adequately absorbs the recoil forces of the gun and that the sighting of the gun may be maintained more accurately than in conventional firing operations. This is particularly true if the trail spades 24 are prevented from digging into the ground during firing of the gun. This may be accomplished by attaching a spade shoe 23 thereto. The spade shoe may comprise a convex shaped metal element having a slot 103 (Fig. 18) for receiving the point 104 of the trail spade. The trail shoe may be clamped thereon by screw threaded clamping members 106 extending through a screw threaded bore 107 in the body of the spade shoe. In order to provide for easy sliding of the trail shoe over the ground in moving the trails from open to closed position or making major traverses of the gun, the spade shoe is preferably provided with a plurality of laterally extending ribs or skids 108 on the bottom surface thereof. It has been found that effective spade shoes may be made sufficiently small that the trails may be closed with the shoes attached to the spades and that such spade shoes maintain the vertical alignment of the gun during firing thereof.

A modified gun platform assembly for a different type of larger size gun is shown in Figs. 10 to 12. The platform 109 shown in these figures may be essentially similar to the platform 20 of Figs. 1 to 3 and be provided with a plurality of spades 41 and 42 which may be essentially the same as those shown in Figs. 8 and 9. They may also be provided with spike receiving members 53 and 54 as well as spike retaining members 57. The sectors of the gun platform will, however, be greater in size and made of heavier material, but may be substantially the same in detail as the gun platform of Figs. 1 to 3 and 6 to 9.

Except for difference in size, the centering assembly, including the yoke supporting member 66' and yoke members 69', 71 and 76, may be substantially identical with those of Figs. 1 to 3 although the member 111 for attaching the centering assembly to the gun carriage differs from the similar member 77 of Figs. 1 to 3. The attaching member 111 constitutes a bar extending between brackets 112 on the gun carriage assembly instead of brackets on the axle, the axle of the gun being positioned in slots 113 on the gun carriage. The centering spindle assembly attached to the gun platform 109 may be of the same type as that shown in Figs. 1 to 3 and need not be again described. The tension rods 114 of Figs. 10 to 13 are positioned internally of the gun trails rather than externally, as shown in Figs. 1 to 3, but are pivoted at their forward ends to a cross member 64' in the same manner as the similar element in Figs. 1 to 3. Since the pivots 116 at the forward end of the tension rods 114 are spaced a considerable distance from the journals 117 for the gun trails, it is impractical to provide an attaching block at the other end of the tension members having apertures spaced sufficiently far apart to enable the gun trails to be either positioned in their open position or closed position. Instead, a pair of studs 118 and 119 carried by brackets 121 and 122, respectively, on each gun trail, are provided. A latching device (not shown in Figs. 10 to 12), similar to that shown in Figs. 4 and 5, may be provided for the attaching blocks 123 on the rearward ends of the tension members 114. It will be understood that trail shoes similar to those shown in Fig. 17 may be applied to the trail spades during firing of the gun. The operation of the device of Figs. 10 to 12 is entirely similar to that of Figs. 1 to 3. It will be understood that firing platforms may be attached to nearly any type of field piece regardless of the size thereof, in a manner analogous to that shown in Figs. 1 to 3 or 10 to 12.

Figure 13:
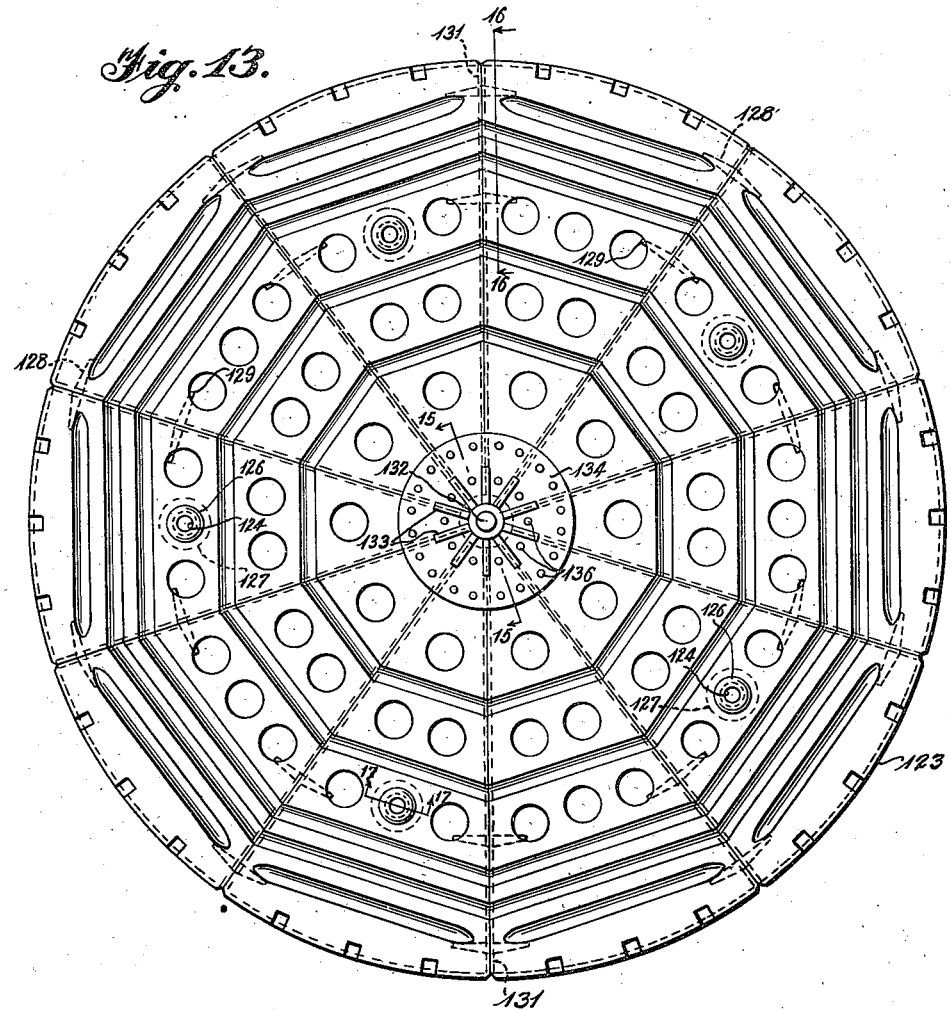
Fig. 13 is a plan view of a modified form of firing platform.

A further modified form of firing platform 123 is shown in Figs. 13 to 16. The platform of these figures has its upper surface positioned in substantially a single plane and the platform is provided with spike apertures 124 through the body of the firing platform rather than providing these apertures in members projecting from the periphery of the platform. As shown in Fig. 17, the apertures 124 may be formed in a flanged tubular member 126 secured to the upper surface of the platform and extending through a reinforcing plate 127 positioned below and secured to the upper surface member. As shown in Figs. 13 and 16, all of the spade members 128 and 129 may be secured to the side flanges 131 of the various sectors of the firing platform and may be of the same general type of spade assemblies as those shown at 40 in Fig. 8. The centering spindle 132 is preferably raised somewhat above the surface of the firing platform and secured in a bracing member 133 welded to a plate 134 secured to the various sectors by bolts 136, reinforcing plate 137 and spacers 138. The firing platform of Figs. 13 to 17 is somewhat less expensive to construct and has the further advantage that it has a smaller vertical dimension so that it is easier to transport. The firing platform of these figures is intended to be supported upon the trails of the gun when they are in closed position and may be attached thereto either above the trails or below the same by any suitable attaching means (not shown) in a manner much more simple than is possible with the firing platform of Figs. 1 to 3. It is of course possible to transport any of the firing platforms this far discussed, either attached to the trails of the gun, or separately.

All of the modifications of the present invention provide for quickly positioning the gun upon the gun platform. It is merely necessary to place the platform on the ground and roll the gun upon the platform. The centering yoke assembly, including the yokes 69 and 71 as well as the tension member 81 of Figs. 1 to 3 or 114 of Figs. 10 to 12 may be left attached to the platform at all times and it is then merely necessary to raise the yoke 71 into alignment with the yoke 76 and insert the pin 74 to attach this portion of the mechanism to the gun. The tension members may be quickly attached to the trails of the gun. Performing the reverse operations entirely frees the gun from the firing platform. Alternatively, the platform itself may be quickly released from all of the connecting members by removing the nut 67' and the connecting members including the tension members and the various yokes elevated and supported from the gun carriage by any suitable carrying means (not shown) during transport of the gun. In the latter case, it is merely necessary to roll the gun upon the platform, align the apertures in the cross member 64' and yoke supporting member 66' with the spindle 67, lower them into position and secure them in adjusted position by the nut 67' It is apparent that the cross member 64' may be made integral with or suitably secured to the yoke supporting member 66' to facilitate this operation. The gun may be rapidly traversed over large arcs by raising the gun trails and rotating the gun carriage on the platform. This is easily accomplished as the gun is usually nearly balanced and the wheels of the gun engage a substantially smooth surface. Ordinarily, modern field pieces have an independent traversing mechanism for traversing the gun through a limited arc without moving the trails. However, for major changes of direction it is necessary to swing the entire gun carriage by movement of the trails. In the present invention this is much more easily accomplished. In addition, the firing platform presents a much more stable mounting of the gun during repeated firing. This is particularly true if the trail spades are not allowed to dig into the ground since the firing platform prevents substantial movement of the gun carriage in either a lateral or longitudinal direction.

While I have disclosed the preferred embodiments of my invention, it is understood that the details thereof may be varied within the scope of the following claims.

I claim:

1. In a firing platform structure for an artillery gun having a carriage assembly provided with wheels with resilient tires mounted thereon, an axle for said wheels and a trail assembly, the combination of a platform providing a circular track for engagement with the tires of said wheels to support said gun and carriage and absorb through said tires the downward stresses produced by firing said gun, pivot means at the center of said track to provide for pivotally securing said carriage assembly to said platform for movement of said carriage about said center and a linkage mechanism connected between said carriage and said pivot means of said platform for preventing lateral and longitudinal movement of said carriage relative to said platform, said linkage mechanism having a connection to said carriage adjacent said axle and providing free downward movement of said carriage with respect to said platform except as restrained by the resiliency of said tires.

2. In a firing platform structure for an artillery gun having a carriage assembly provided with wheels with resilient tires mounted thereon, an axle for said wheels, and a trail assembly, the combination of a platform providing a circular track for engagement with the tires of said wheels to support said gun and carriage and absorb through said tires the downward stresses produced by firing said gun, pivot means at the center of said track to provide for pivotally securing said carriage assembly to said platform for movement of said carriage about said center, linkage mechanism connected between said pivot means of said platform and said carriage for preventing lateral movement of said carriage with respect to said platform, said linkage mechanism being connected to said carriage adjacent said axle, and another linkage mechanism connected to said pivot means and extending rearwardly and connected to said trail assembly for preventing longitudinal movement of said carriage relative to said platform, said linkage mechanisms providing free downward movement of said carriage with respect to said platform except as restrained by the resiliency of said tires.

3. In a firing platform structure for an artillery gun having a carriage assembly provided with wheels with resilient tires mounted thereon, an axle for said wheels, and a trail assembly, the combination of a platform providing a circular track for engagement with the tires of said wheels to support said gun and carriage and absorb through said tires the downward stresses produced by firing said gun, pivot means at the center of said track to provide for pivotally securing said carriage assembly to said platform for movement of said carriage about said center, linkage mechanism connected between said pivot means and said carriage adjacent said axle for preventing lateral movement of said carriage with respect to said platform, and tension members extending between said pivot means and said trail assembly for preventing rearward movement of said carriage relative to said platform, said linkage mechanism and tension members providing free downward movement of said carriage with respect to said platform except as restrained by the resiliency of said tires.

4. In a firing platform structure for an artillery gun having a carriage assembly provided with wheels and a trail assembly, a platform providing a circular track for said wheels and means for securing said carriage assembly to said platform for movement of said carriage about the center of said track, said platform comprising a plurality of sectors having top members and downwardly directed side flange members and means extending through said flanges for securing said sectors together, the lower surface of said platform being provided with a plurality of circumferential rows of downwardly directed spades secured to the lower portion thereof, the spades in one of said rows being circumferentially staggered with respect to the spades in another of said rows, and at least some of said spades being secured to said downwardly directed flanges.

5. In a firing platform structure for an artillery gun having a carriage assembly provided with wheels and a trail assembly, a platform providing a circular track for said wheels and means for securing said carriage assembly to said platform for movement of said carriage about the center of said track, said platform comprising a plurality of sectors having downwardly directed side flanges and a downwardly directed outer edge flange, means associated with said edge flanges for securing said sectors together, a downwardly extending flange member extending across each of said sectors and spaced from said outer edge flange to produce a chamber having a downwardly directed opening and closed top and side walls, said platform having a plurality of circumferential rows of downwardly directed spades secured to the lower portion thereof, the spades in one of said rows being circumferentially staggered with respect to the spades in another of said rows.

6. In a firing platform structure for an artillery gun having a carriage assembly provided with wheels and a trail assembly, a platform providing a circular track for said wheels, said platform having a vertically extending spindle secured thereto at the center of said track and means pivotally secured to said spindle for attaching said carriage assembly to said spindle for movement of said carriage about said spindle, said means comprising a linkage including a plurality of pivotally connected yoke members for attaching said carriage to said spindle to prevent lateral movement of said carriage relative to said platform while providing for vertical movement of said carriage relative to said platform and linkage mechanism extending between said spindle and said trail assembly for preventing longitudinal movement of said carriage relative to said platform.

7. In a firing platform structure for an artillery gun having a carriage assembly provided with wheels and a divided trail assembly, a platform providing a circular track for said wheels, a vertically extending spindle secured to said platform at the center of said track, means for securing said carriage to said spindle, said means including a cross member journaled on said spindle, a tension member extending from each end of said cross member to one of the trails of said divided trail assembly for preventing movement of said carriage longitudinally of said gun relative to said platform, a yoke attaching member also journalled upon said spindle, and means including a plurality of pivotally connected yokes for attaching said carriage to said spindle to prevent lateral movement of said carriage relative to said platform while providing for vertical movement of said carriage relative to said platform.

8. In a firing platform structure for an artillery gun having a carriage assembly provided with wheels and a trail assembly, a platform providing a circular track for said wheels and means for securing said carriage assembly to said platform for movement of said carriage about the center of said track, said platform comprising a plurality of sectors having top members and downwardly directed side flange members and means extending through said flanges for securing said sectors together, the lower surface of said platform being provided with a plurality of angularly disposed spades, at least some of said spades being secured to said downwardly directed flanges.

9. In a firing platform structure for an artillery gun having a carriage assembly provided with wheels and a trail assembly, a platform providing a circular track for said wheels and means for securing said carriage assembly to said platform for movement of said carriage about the center of said track, said platform comprising a plurality of sectors having downwardly directed side flanges and a downwardly directed outer edge flange, means associated with said edge flanges for securing said sectors together, a downwardly extending flange member extending across each of said sectors and spaced from said outer edge flange to produce a chamber having a downwardly directed opening and closed top and side walls.

ADOLPH P. BUQUOR.

REFERENCES CITED

The following references are of record in the file of this patent:

UNITED STATES PATENTS

| Number | Name | Date |
|---|---|---|
| 1,120,483 | Heilemann et al. | Dec. 8, 1914 |
| 1,318,233 | Schneider | Oct. 7, 1919 |
| 1,332,762 | Schneider | Mar. 2, 1920 |
| 2,239,559 | Hammar | Apr. 22, 1941 |
| 1,108,763 | Koch | Aug. 25, 1914 |
| 1,112,951 | Voller | Oct. 6, 1914 |

FOREIGN PATENTS

| Number | Country | Date |
|---|---|---|
| 468,330 | France | Apr. 21, 1914 |
| 822,265 | France | Sept. 13, 1937 |
| 87,870 | Australia | Apr. 10, 1922 |
| 309,125 | Germany | Aug. 18, 1920 |
| 816,093 | France | Apr. 26, 1937 |